United States Patent
Kwon

(10) Patent No.: US 6,345,370 B1
(45) Date of Patent: Feb. 5, 2002

(54) METHOD FOR DEBUGGING ERROR IN A COMPUTER SYSTEM

(75) Inventor: Young-Sig Kwon, Suwon (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/115,761

(22) Filed: Jul. 15, 1998

(30) Foreign Application Priority Data

Jul. 15, 1997 (KR) .............................................. 97-32932

(51) Int. Cl.$^7$ ................................................. H02H 3/05
(52) U.S. Cl. ....................................................... 714/44
(58) Field of Search ............................ 713/1–2; 714/16, 714/17, 35, 36, 44; 710/10, 18, 19; 712/227, 244

(56) References Cited

U.S. PATENT DOCUMENTS

| | | | |
|---|---|---|---|
| 3,937,938 A | * 2/1976 | Matthews | ................... 235/153 |
| 4,837,764 A | 6/1989 | Russello | ...................... 371/20 |
| 5,119,377 A | 6/1992 | Cobb et al. | ................... 371/19 |
| 5,257,269 A | 10/1993 | Hamauchi | ................... 371/29.5 |
| 5,463,764 A | 10/1995 | Mueller | ................. 395/182.13 |
| 5,513,315 A | * 4/1996 | Tierney et al. | ......... 395/183.13 |
| 5,600,785 A | 2/1997 | Potter | .................... 395/182.21 |
| 5,600,789 A | 2/1997 | Parker et al. | .......... 395/183.14 |

* cited by examiner

Primary Examiner—John A. Follansbee
(74) Attorney, Agent, or Firm—Robert E. Bushnell, Esq.

(57) ABSTRACT

A method for debugging an error occurring while a device driver of a computer system recognizes a peripheral device such as a digital video disk ROM (DVD-ROM). The method includes the steps of storing a plurality of commands which are to be transferred from the device driver to the peripheral device through an advanced technology attachment packet interface (ATAPI) bus for checking a status of the peripheral device in a memory; executing a plurality of commands while checking whether an error occurs in step by step to identify a command which results in an error; and debugging the error depending on the command which results in the error. As a result, an error occurred during installation of the DVD-ROM drive in the computer system may be debugged simply and effectively.

20 Claims, 2 Drawing Sheets

METHOD FOR DEBUGGING ERROR IN A COMPUTER SYSTEM

CLAIM FOR PRIORITY

This application makes reference to, incorporates the same herein, and claims all benefits accruing under 35 U.S.C. §119 from an application for METHOD FOR DEBUGGING ERROR IN A COMPUTER SYSTEM earlier filed in the Korean Industrial Property Office on the 15$^{th}$ of Jul. 1997, and there duly assigned Ser. No. 32832/1997, a copy of which application is annexed hereto.

BACKGROUND OF THE INVENTION

1. Technical Field

The present invention relates to a computer system, and more particular, to a method for debugging an error found during interfacing a peripheral device to a computer system.

2. Related Art

In a computer system, several peripheral devices are interfaced to a central processing unit (CPU) of a computer system via a respective device driver and an interface bus. For example, a Digital Video Disk ROM (DVD-ROM) drive is connected to the CPU through a device driver and an interface bus, so that the DVD-ROM drive receives/sends data from/to the CPU. When the computer system outputs a command to the interface bus, the DVD-ROM drive performs the command instruction and outputs the result to the CPU. The number of commands which can be issued by the CPU to the DVD-ROM drive is typically more than 30.

When the computer system which has the DVD-ROM drive is assembled and the system performance test is carried out, an error may be found such that the CPU cannot access the DVD-ROM drive. Such an error may also occur during the operation of the computer system. One example of system testing of computer peripherals is disclosed in U.S. Pat. No. 4,837,764 for Programmable Apparatus And Method For Testing Computer Peripherals issued to Russello. A debugging module may be installed in the device driver, such as disclosed in U.S. Pat. No. 5,463,764 for Method And System For System Debugging Through A Keyboard Device Driver issued to Mueller, for debugging and diagnostic purposes. An error which occurs during installation of a DVD-ROM drive may be debugged relatively easily if the test personnel or the user knows which command was issued by the CPU before the occurrence of the error.

One contemporary technique of identifying the command issued by the CPU before the occurrence of an error relates to the use of a spectrum analyzer or different types of test equipments. However, the use of a spectrum analyzer or test equipments for identifying the command which results in an error can be time-consuming and burdensome. In addition, if an error occurs while the user operates the computer system, the user cannot access the test equipment. Another contemporary technique for identifying the command issued by the CPU is by trial-and-error. According to this technique, the user manipulates the computer system so that the CPU issues an instruction to the device driver to watch the status of the computer system. If there is no problem in the computer system, the user manipulates the CPU to issue another instruction to the device driver. Such actions are carried out until an error occurs. However, this technique also has drawbacks in that too much time is required to identify the command before the error. Further, since there exist a plurality of commands applied by the device driver to the DVD-ROM drive for each instruction issued by the CPU to the device driver, it is difficult to identify the exact command which results in the error. Furthermore, the system may halt during the required repetitive steps, so that the user may have to restart the system several times until the test is completed.

SUMMARY OF THE INVENTION

Accordingly, it is therefore an object of the present invention to provide a method for simply and effectively debugging an error during installation of a peripheral device in a computer system.

It is also an object to provide a method for simply and effectively identify and debugging an error occurring in connection with a peripheral device in a computer system having a central processing unit.

It is further an object to provide a method for debugging an error occurring while a device driver of a computer system recognizes a peripheral device.

These and other objects of the present invention can be achieved by a method for debugging an error during installation of a peripheral device such as a digital video disk ROM (DVD-ROM) in a computer system which comprises the steps of: storing a plurality of commands in a memory which are to be transferred from a device driver of a computer system to a peripheral device, via an interface bus, for checking status of the peripheral device; executing a plurality of commands while checking whether an error occurs, step-by-step, to identify a specific command which results in an error; and debugging the error in dependence upon the command which results in the error. As a result, an error occurring during the installation of the DVD-ROM drive in the computer system may be debugged simply and effectively.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 2:
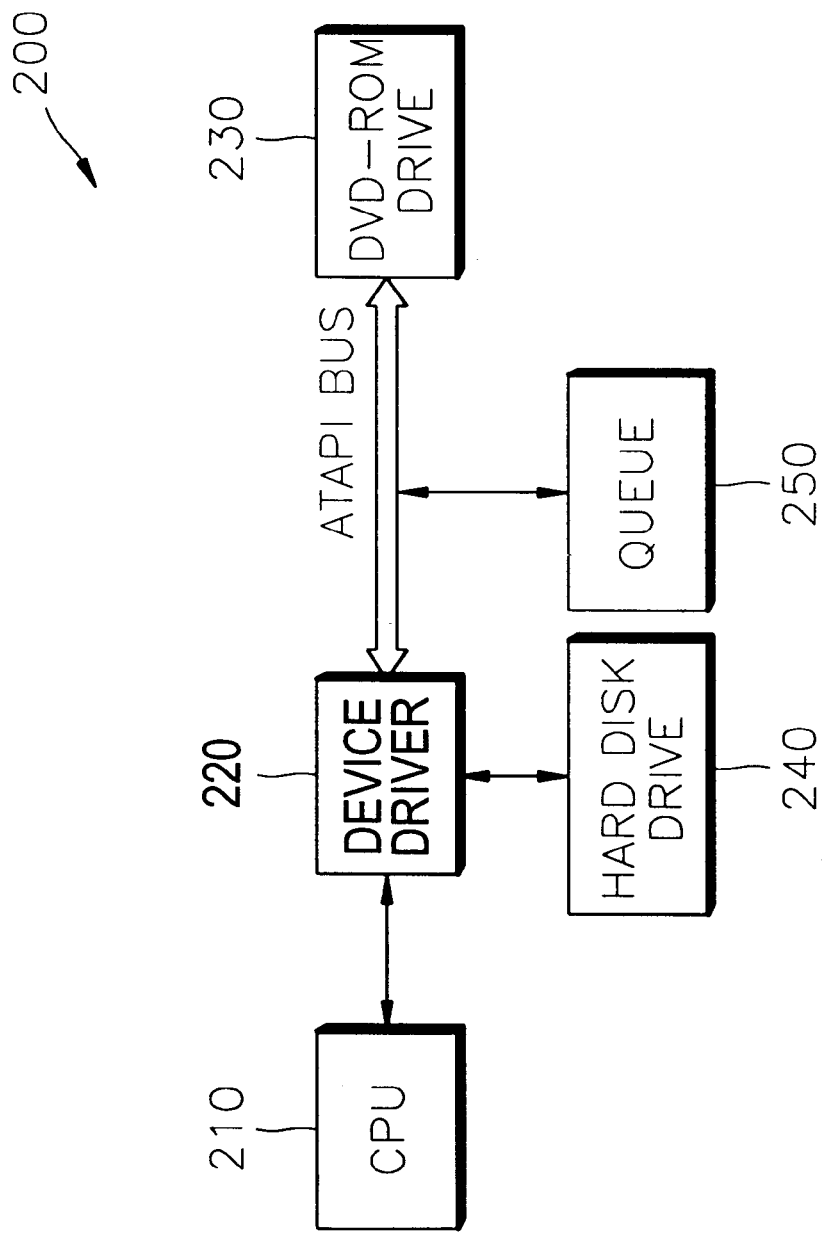
FIG. 2 is a block diagram of a computer system for implementing a process of debugging an error occurring in connection with a peripheral device in a computer system having a central processing unit according to the principles of the present invention.

Referring now to the drawings and particularly to FIG. 2, which illustrates a computer system 200 for implementing a process of debugging an error occurring in connection with a peripheral device in a computer system having a central processing unit according to the principles of the present invention. The computer system includes a central processing unit (CPU) 210, a device driver 220, a DVD-ROM drive 230 connected to the device driver 220 via an advanced technology attachment packet interface (ATAPI) bus, a hard disk drive 240, and a queue 250. The hard disk drive 240 stores a plurality of commands, output by the device driver 210 to the DVD-ROM drive 220 via an ATAPI bus, in a file format until an error is detected. The queue 250 temporarily stores the commands stored in the file in the hard disk drive 240 in order to analyze the cause of the error.

Figure 1:
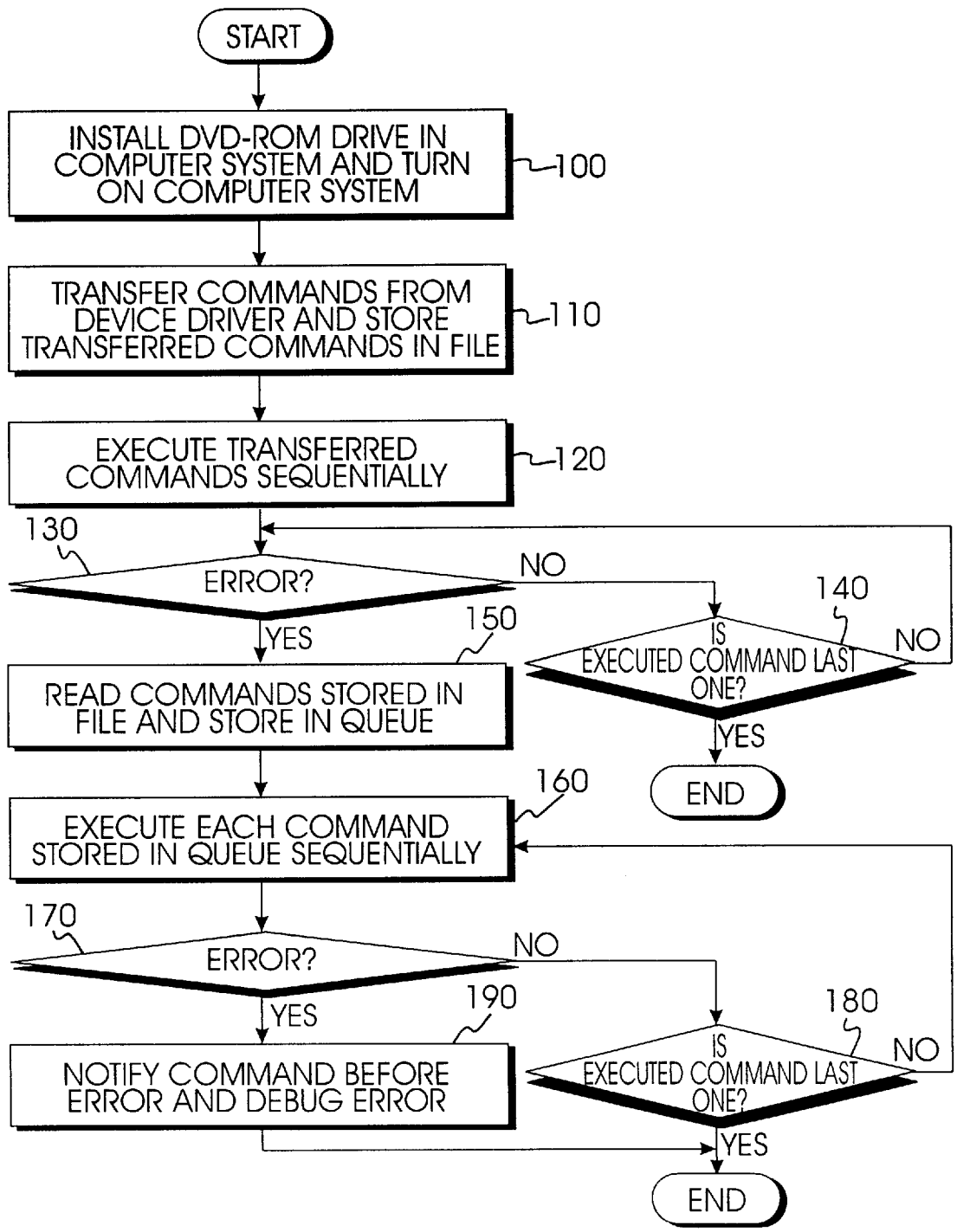
FIG. 1 is a flow chart illustrating a process of debugging an error occurring in connection with a peripheral device in a computer system having a central processing unit according to the principles of the present invention.

Next, a process of debugging an error found between the CPU 210 and the DVD-ROM drive 230 of a computer system as shown in FIG. 2 will be described in detail with reference to FIG. 1 hereinbelow.

In step 100, the DVD-ROM drive 230 is installed in the computer system 200, and then a power of the computer system 200 is turned on. After the power of the computer system 200 is turned on, the device driver 220 outputs a series of commands sequentially to the DVD-ROM drive 220 through an ATAPI bus at step 110. Here, the commands output from the device driver 220 to the DVD-ROM drive 220 through an ATAPI bus includes a reset command, a register read/write command for checking the operation of the DVD-ROM drive 230, a command for inquiring the identification of information stored in the DVD-ROM, and a command for checking a status of the DVD-ROM drive 230. Whenever, a command is transferred from the device driver 220 to the DVD-ROM drive 230, the DVD-ROM drive 230 stores the command in a file format in the hard disk drive 240.

Each command sequentially transferred to the DVD-ROM drive 230 is executed, when received by the DVD-ROM drive 230 at step 120. At this time, the CPU 210 determines whether an error occurs while the DVD-ROM drive 230 executes the command at step 130. If there is no error at step 130, the CPU 210 determines whether the executed command is the last one among the ones to be executed in order to test the installation of the DVD-ROM drive 230 at step 140. If the executed command is indeed the last one among the ones to be executed in order to test the installation of the DVD-ROM drive 230, the CPU 210 determines that the installation of the DVD-ROM drive 230 is completed and terminates the procedure. If the executed command is not the last one at step 140, the DVD-ROM drive 230 continues the execution of a next command.

Meanwhile, if there is an error at step 130, error debugging steps 150 through 190 will be carried out. First, in step 150, the commands transferred from the device driver 220 to the DVD-ROM drive 230 through an ATAPI bus are read out from the file in the hard disk drive 240 and stored into the queue 250. For example, in case that three commands, e.g. the reset command, the register read/write command, and the command for inquiring the identification of information stored in the DVD-ROM, are stored in the file of the hard disk drive 240 and an error is found while executing the register read/write command, the tree commands stored in the file is read out and stored in the queue 250. Then, the device driver 220 reads out the first one of the commands stored in the queue 250 and transfers the read-out command to the DVD-ROM drive 230, so that the command is executed by the DVD-ROM drive 230 at step 160. The CPU 210 determines whether an error occurs while the DVD-ROM drive 230 executes the command transferred from the device driver 210 at step 170. If there is no error at step 170, the CPU 210 determines whether the executed command (at this time, the first one) is the last one of the commands stored in the queue 250 at step 180.

If the executed command is not the last one at step 180, another command is read out from the queue 250 and transferred to the DVD-ROM drive 230, and steps 160 through 180 are performed to identify the command just before the detected error, step-by-step. If the executed command is the last command at step 180, the procedure is terminated.

If there is an error at step 170 however, the CPU 210 determines that an error has occurred during the execution of the command just before and notifies the command to the user for debugging purposes at step 190. The CPU 210 may debug the error depending on the type of errors.

While there have been illustrated and described what are considered to be preferred embodiments of the present invention, it will be understood by those skilled in the art that various changes and modifications may be made, and equivalents may be substituted for elements thereof without departing from the true scope of the present invention. For example, even though the CPU 210 controls an error debugging process in a preferred embodiment of the present invention, another controller may be provided to control the error debugging process. In addition, in the error debugging steps 160 through 180, although each of the commands was executed automatically step-by-step in the preferred embodiment each of the command may be executed manually, i.e., under the instruction of the user. Further, either the file in the hard disk drive 240 or the queue 250 may be dispensed with so that a single device may be employed in the computer system of FIG. 2. Many other modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for debugging an error occurring while a device driver of a computer system recognizes a peripheral device, said method comprising the steps of:

sequentially transferring, via an interface bus, a plurality of commands from said device driver to said peripheral device, said commands being utilized to recognize said peripheral device;

sequentially storing, in a memory, each of said plurality of commands received by said peripheral device until an error occurs;

transferring the commands stored in said memory to a queue;

executing, step-by-step, said commands stored in said queue to identify which command results in said error while checking whether said error occurs again; and debugging said error depending on the command which results in said error.

2. The method of claim 1, further comprised of said step of sequentially transferring, via an interface bus, a plurality of commands from said device driver to said peripheral device comprising a step of said device driver responding to instructions generated by a central processing unit when said computer system is turned on.

3. The method of claim 1, further comprised of said interface bus corresponding to an advanced technology attachment packet interface bus.

4. The method of claim 1, further comprised of said peripheral device corresponding to a digital video disk read-only-memory (DVD-ROM) drive.

5. The method of claim 4, further comprised of said plurality of commands comprising a reset command, a register read/write command for checking operation of said digital video disk read-only-memory (DVD-ROM) drive, an inquiry command for inquiring identification of information stored in a digital video disk, and a command for checking status of said digital video disk read-only-memory (DVD-ROM) drive.

6. A method for testing and debugging an error during installation of a peripheral device in a computer system comprising a central processing unit, a device driver, a memory, and a queue, said method comprising the sequential steps of:

installing a peripheral device in said computer system and turning said computer system on;

generating instructions, by said central processing unit, for installing said peripheral device;

outputting, from said device driver in response to said instructions, a series of commands sequentially to said peripheral device, via an interface bus;

storing each command received by said peripheral device in a memory;

sequentially executing, at said peripheral device, each of said received commands;

determining, at said central processing unit, whether there is occurrence of an error while said peripheral device sequentially executes each of said received commands;

when said central processing unit determines an occurrence of an error, stopping the storing and executing steps, reading, by said device driver, the commands stored in said memory and and storing the read commands in said queue;

reading, by said device driver, one-by-one the commands stored in said queue and transferring each read command to said peripheral device;

executing, at said peripheral device, each of said commands read out from said queue;

determining, at said central processing unit, whether there is occurrence of an error while said peripheral device executes each of said commands read out from said queue; and when said central processing unit determines an occurrence of said error while said peripheral device executes each of said commands, notifying a user of a specific command which causes said error and debugging said error which occurs during installation of said peripheral device.

7. The method of claim 6, further comprised of said interface bus corresponding to an advanced technology attachment packet interface bus.

8. The method of claim 7, farther comprised of said peripheral device corresponding to a digital video disk read-only-memory (DVD-ROM) drive.

9. The method of claim 8, further comprised of said series of commands comprising a reset command, a register read/write command for checking operation of said digital video disk read-only-memory (DVD-ROM) drive, an inquiry command for inquiring identification of information stored in a digital video disk, and a command for checking status of said digital video disk read-only-memory (DVD-ROM) drive.

10. The method of claim 6, said step of determining, at said central processing unit, whether there is occurrence of an error while said peripheral device sequentially executes each of said received commands further comprising the steps of:

determining whether each executed command is a last command to be executed, when said central processing unit does not determine that there is an occurrence of an error;

when it is determined that said executed command is the last one to be executed, terminating the testing and debugging process; and alternatively, when it is determined that said executed command is not the last one to be executed, storing a executing a next one of said received commands.

11. The method of claim 10, further comprised of said peripheral device corresponding to a digital video disk read-only-memory (DVD-ROM) drive.

12. The method of claim 11, further comprised of said series of commands comprising a reset command, a register read/write command for checking operation of said digital video disk read-only-memory (DVD-ROM) drive, an inquiry command for inquiring identification of information stored in a digital video disk, and a command for checking status of said digital video disk read-only-memory (DVD-ROM) drive.

13. The method of claim 6, said step of determining, at said central processing unit, whether there is occurrence of an error while said peripheral device executes each of said commands read out from said queue further comprising the steps of:

determining whether each executed command is a last one to be executed, when said central processing unit does not determine that there is an occurrence of an error;

when it is determined that said executed command is the last one to be executed, terminating the testing and debugging process; and alternatively, when it is determined that said executed command is not the last one to be executed, reading, by said device driver, a next one of said commands from said queue and transferring the read command to said peripheral device to be executed.

14. The method of claim 13, further comprised of said peripheral device corresponding to a digital video disk read-only-memory (DVD-ROM) drive.

15. The method of claim 14, further comprised of said series of commands comprising a reset command, a register read/write command for checking operation of said digital video disk read-only-memory (DVD-ROM) drive, an inquiry command for inquiring identification of information stored in a digital video disk, and a command for checking status of said digital video disk read-only-memory (DVD-ROM) drive.

16. A computer system, comprising:

a device driver;

a hard disk drive connected to said device driver;

a peripheral device connected to said device driver, via an interface bus; and a central processing unit for testing and debugging an error occurring while said device driver recognizes installation of said peripheral;

said central processing unit generating instructions for controlling said device driver, when said computer system is turned on, for installing said peripheral device;

said device driver transferring installation commands to said peripheral device;

said peripheral device storing received ones of said installation commands in a file format on said hard disk drive;

said peripheral device executing the received ones of said installation commands until said central processing unit detects the occurrence of an error while said peripheral device executes the installation commands;

said device driver transferring the commands stored in said file format on said hard disk drive to a queue;

said device driver sequentially reading, one-by-one, said commands from said queue and transferring the read command to said peripheral device;

said peripheral device executing the command read from said queue and said central processing unit determining whether the executed command results in an error;

said peripheral device executing a next command read from said queue until said central processing unit determines an error occured or until a last one of the commands is read from the queue and executed; and said central processing unit debugging said error depending on the command which results in said error.

17. The computer system of claim 16, further comprised of said interface bus corresponding to an advanced technology attachment packet interface bus.

18. The computer system of claim 16, further comprised of said peripheral device corresponding to a digital video disk read-only-memory (DVD-ROM) drive.

19. The computer system of claim 18, further comprised of said installation commands comprising at least a reset command, a register read/write command for checking operation of said digital video disk read-only-memory (DVD-ROM) drive, an inquiry command for inquiring identification of information stored in a digital video disk, and a command for checking status of said digital video disk read-only-memory (DVD-ROM) drive.

20. The computer system as set forth in claim 16, wherein said peripheral device stops storing commands in said file format on said hard disk drive when an executed command results in an error.

* * * * *